March 21, 1950  W. G. KÖGEL  2,501,606
ABSORPTION REFRIGERATION
Filed Oct. 25, 1944
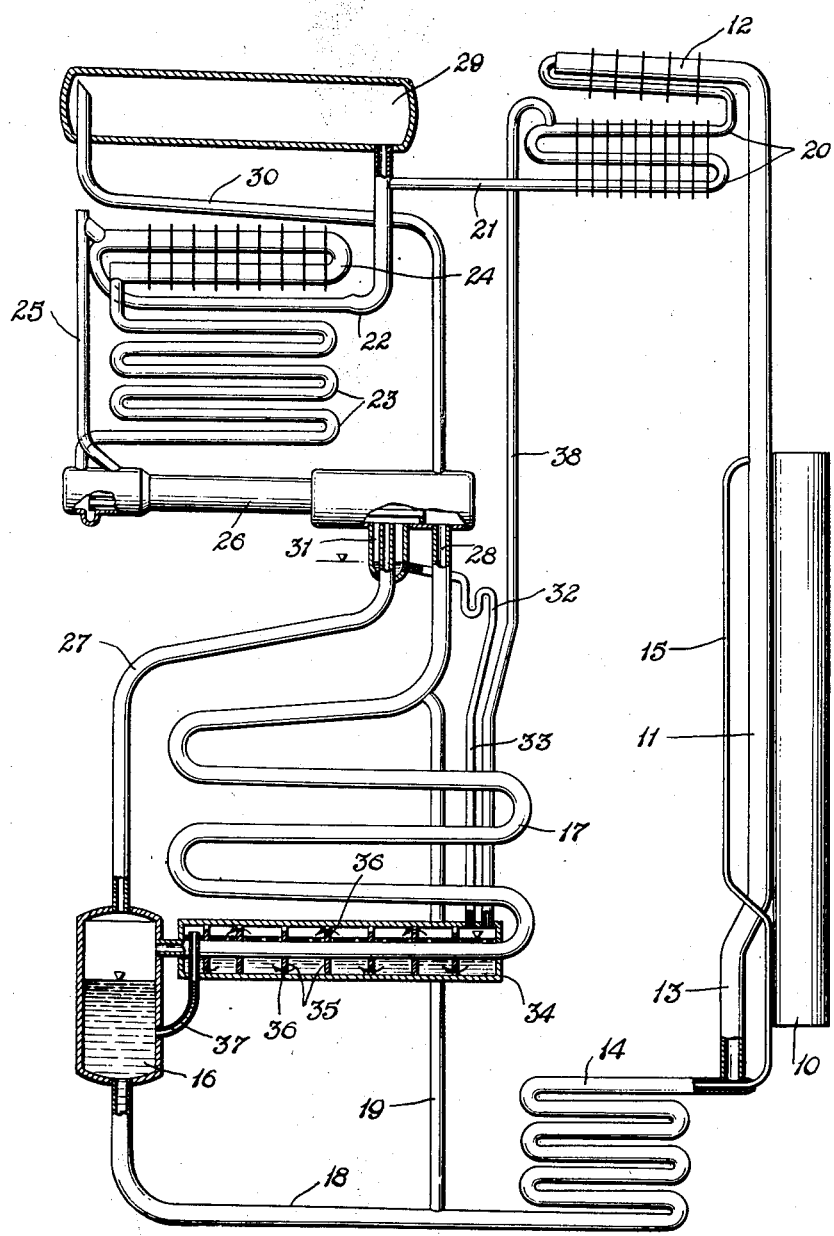
INVENTOR
Wilhelm Georg Kögel
BY
D. E. Heath
his ATTORNEY Patented Mar. 21, 1950

2,501,606

UNITED STATES PATENT OFFICE 2,501,606

ABSORPTION REFRIGERATION

Wilhelm Georg Kögel, Stockholm, Sweden, assignor to Aktiebolaget Elektrolux, Stockholm, Sweden, a corporation of Sweden Application October 25, 1944, Serial No. 560,239
In Sweden April 19, 1944

12 Claims. (Cl. 62—119.5)

The present invention relates to an improvement for automatically regulating the refrigerant concentration of the absorption solution in absorption refrigerating apparatus with a circulation system for absorption solution and a circulation system for an inert gas. The invention is concerned with improving the efficiency of the apparatus, especially under certain operating conditions, as well as improving the distribution of temperature in the evaporator of the apparatus.

It has been found that the efficiency of refrigerating apparatus of the above-mentioned kind is improved when the refrigerant concentration of the absorption solution is adjusted to the evaporator load or the temperature of the cooling air. Several proposals have been made for effecting a regulation of this kind. It is thus already known to arrange a so-called concentration vessel for collecting the refrigerant condensate which, on low evaporator load, passes in an unevaporated state through the evaporator. It has, however, been found that the return of refrigerant stored in this manner to the absorption solution and through this solution to the evaporator is too slow for ensuring the desired effect. Especially in the case of household refrigerating apparatus the exchange of refrigerant between the liquid circulation system and the gas circulation system is, in fact, so slow relative to the variations in the operating conditions of the apparatus that it has not been possible to obtain any correspondence between said variations and the provoked changes of the refrigerant concentration of the absorption solution. The invention is characterized chiefly in that, on decreasing evaporator load or at increasing absorber temperatures refrigerant is drawn off from the circulation system of the absorption solution and, instead, caused to circulate through the gas circulation system.

The invention will in the following be more fully described with reference to the embodiment shown diagrammatically in the accompanying drawing from which also other characteristic features of the invention will be seen.

The single figure diagrammatically illustrates a domestic refrigerating apparatus operating with an inert gas, it being assumed that the apparatus operates with ammonia as refrigerant, water as absorbent and hydrogen gas as an inert gas. In the drawing, 10 designates a flue tube through which heat, from a source of heat not shown, is supplied to the boiler or heat receiving part 11 of the apparatus. The boiler is formed by the middle part of a pipe arranged by welding in heat-conducting relation with the tube 10, the upper part of said pipe forming an air-cooled water separator 12, while its lowest part 13 is connected to the liquid heat exchanger 14 of the apparatus. 15 designates the liquid circulation pump of the apparatus, 16 the so-called absorber vessel and 17 the air-cooled absorber of the apparatus built up of a tube coil. From the absorber vessel 16 rich solution is, through a conduit 18 and the inner tube of the heat exchanger 14, sucked into the pump 15, which keeps up a liquid column in the boiler 11. From the boiler 11 poor solution flows through the outer jacket of the heat exchanger 14 and a conduit 19 to the absorber 17. This part of the liquid circulation system is arranged in a manner known per se.

The boiler vapours formed flow through the upper part of the tube 11 and the water separator 12 into the air-cooled condenser 20 of the apparatus from whence refrigerant condensate flows through conduits 21 and 22 into the evaporator 23 of the apparatus built up of a tube coil. The upper part of the evaporator forms a space cooler 24, while the lower part is arranged for low temperature cooling and ice-making. The upper part of the evaporator coil communicates with the absorber vessel 16 by a conduit 25 and the gas heat exchanger of the apparatus designated by 26 as well as a conduit 27. The gas rich in ammonia flows towards said vessel, and then passes through the absorber 17 and a conduit 28 and the gas heat exchanger 26 into the lower part of the evaporator coil. Gas and refrigerant thus pass through the evaporator in mutual countercurrent. The pressure-equalizing vessel 29 of the apparatus is, through the conduit 22 and a conduit 30, connected in known manner to the gas circulation system. As will be readily seen, this system works in a manner known per se.

The refrigerant concentration of the absorption solution is such that under certain operating conditions, especially on low evaporator load or at low cooling air temperatures, there ensues an excess of liquid refrigerant which, without evaporating, passes through the evaporator coil 23 and the jacket tube of the gas heat exchanger 26. The liquid is caught in a container 31 where the liquid level indicated in the drawing is formed and from which condensate, through a liquid seal 32 and a conduit 33, flows into a tubular container 34 arranged concentrically around the lowest part of the absorber coil. The conduit 27 communicates with the container 31 above the over-flow pipe between said container and the liquid seal 32. The container formed by the jacket 34 is, by a number of partitions 35, divided into a corresponding number of chambers which communicate with each other in a manner known per se by means of orifices 36 at the upper and lower edges of the partitions. The conduit 33 communicates with the first of the chambers, and liquid is caused to flow in the direction of the arrows through the bottom hole of the partition into the second chamber, thus making possible a continuous renewal of the bottom layer in said two chambers. In the second chamber the liquid level rises to the opening at the upper edge of the partition through which the condensate flows into the third chamber and from thence through the bottom orifice of the latter into the next chamber etc. Through small openings at the upper edges of the other partitions the vapour spaces of all chambers are in continuous open communication with each other, as is evident from the drawing. The liquid level in the container 34 is determined by the over-flow of a conduit 37 by which the container communicates with the absorber vessel 16. The vapour spaces of the container 34 communicate by a conduit 38 with the condenser 20 of the apparatus.

As is well known, the boiler temperature in an absorption refrigerating apparatus increases with decreasing refrigerant concentration of the absorption solution. The increased boiler temperature causes increased rectifying losses and increased radiation losses. Efforts are therefore always made to keep the boiler temperature as low as possible, that is, to operate with the highest possible refrigerant concentration. Especially in the case of air-cooled absorption refrigerating apparatus, however, due regard must be given to the temperature of the cooling air. If the absorption solution leaves the boiler at a relatively high refrigerant concentration, the absorbent capacity will be correspondingly lower, with the result that the generation of cold will deteriorate. It is above all difficult to obtain low evaporator temperatures. However, a domestic refrigerating apparatus works in practice under very changing operating conditions. Both the temperature of the cooling air and the temperature in the evaporator are changed within wide limits, the former owing to weather changes and the latter above all due to the introduction of water-filled ice trays into the evaporator for freezing purposes.

It is assumed that the apparatus operates at a normal cooling air temperature of 20° C. and that the evaporator 23 has a temperature of —8° C. The refrigerant contents of the apparatus are such that under said operating conditions a certain part of the refrigerant flowing through the conduit 22 into the evaporator, passes, without being evaporated, through the whole evaporator coil 23, and flows through the heat exchanger 26 and the liquid seal 32 into the storage vessel 34. Owing to the heat-conducting contact with the absorber coil 17 a continuous evaporation or boiling of refrigerant is going on in vessel 34, the vapours formed being condensed in the condenser 20. This evaporation of refrigerant results in a valuable secondary action, namely an extra cooling of the absorber. The condensate is returned through the conduits 21 and 22 into the evaporator. A continuous circulation of the refrigerant excess thus takes place. If it is now assumed that ice trays filled with water are introduced into the low temperature portion of the evaporator cooled by the coil 23, the temperature of said low temperature portion rises to about 0° C., and remains in the first phase of the freezing process immediately below 0°. The inert gas can therefore absorb more refrigerant vapour than before, and the partial pressure of the vapour rises rapidly, if the supply of liquid refrigerant is sufficient. The invention not only ensures just this supply, but also makes it continuous during the whole period in which the temperature of the evaporator is rising. By suitably adjusting the amount of refrigerant in the apparatus and suitably dimensioning the container 34, it is always possible to obtain a variation of the amount of active refrigerant well adjusted to the generally occurring variations of the evaporator load.

The increase in the partial pressure of refrigerant vapour in the inert gas causes a transfer of refrigerant from the container 34 to the circulation system of the absorption solution, resulting in a corresponding increase of the refrigerant concentration in the boiler. This will cause its temperature to fall, and the vapour pressure of the refrigerant in the boiler vapours flowing to the condenser will increase, the supply of liquid refrigerant to the evaporator being gradually partially shifted from the container 34 to the boiler 11. It is even possible to make the total supply constant, that is, independent of the variations in the operating conditions of the apparatus.

As soon as the temperature in the evaporator again falls, the vapour pressure in the gas will be gradually reduced with an excess of refrigerant as an immediate result. The excess is again collected in the storage vessel 34, and the refrigerant concentration of the absorption solution is correspondingly reduced. Gradually there ensues a stationary state, the concentration of the absorption solution being automatically maintained at a level adjusted to the lowered load on the evaporator. Part of the excess refrigerant is stored in the container 34, and part thereof circulates continuously through the special circulation system for excess refrigerant in accordance with the invention. The relation between these two parts is determined by the size of the heat-conducting contact between the refrigerant stored in the vessel 34 and the absorber coil 17 and by the actual absorption temperature. No matter whether the circulating part of the excess refrigerant is great or small, this circulation will take place without any corresponding loss of energy, because the refrigerant, when circulating, does not come into contact with the absorption solution. Certain losses are, however, caused by the fact that the refrigerant condensate from the condenser has, relatively to the evaporator, a high temperature which, however, may be reduced by a corresponding increase of the cooling surface of the condenser. It is therefore generally advantageous to prevent an unnecessarily vigorous circulation, but on the other hand, this circulation should be sufficiently strong to prevent loss of liquid refrigerant upon a sudden increase of the evaporator load due to the introduction of water filled ice trays. The adjustment of the extent of the circulation as well as of the size of the refrigerant reserve in the container 34 must be done with respect to the size of the apparatus, its function and the climatic conditions under which it is normally intended to work.

The invention is not limited to the embodiment described, but may be modified in several ways, without departing from the spirit and scope of the invention.

I claim:

1. In an absorption refrigerating system employing inert gas and having a circuit for absorption liquid, a gas circuit including an evaporator and absorber, a still including a boiler in said absorption liquid circuit and a condenser connected to deliver liquid to said evaporator, an auxiliary evaporator connected to receive excess liquid from said first evaporator and deliver vapor to said condenser, said auxiliary evaporator being arranged to cool at least a part of said absorber, the vapor delivered from said auxiliary evaporator to said condenser being liquefied in the latter for reintroduction to said evaporator.

2. In the art of refrigeration employing a system using inert gas into which refrigerant evaporates at a place of evaporation and from which refrigerant is absorbed into absorption solution at a place of absorption, the improvement which comprises flowing liquid refrigerant from the place of evaporation to a place in heat exchange relation with the place of absorption and out of physical contact with the solution therein, vaporizing liquid refrigerant at said last-mentioned place by heat of absorption, liquefying the vaporized refrigerant and conducting substantially all of such liquid to the place of evaporation.

3. In the art of refrigeration employing a system using inert gas into which refrigerant evaporates at a place of evaporation and from which refrigerant is absorbed into absorption solution at a place of absorption, at least a part of the heat of absorption rejected at the place of absorption being taken up by cooling air, the improvement which comprises flowing excess liquid leaving the place of evaporation to a place of vaporization, vaporizing such liquid at the place of vaporization by heat rejected at the place of absorption and while the liquid is segregated from the solution, condensing the vaporized fluid by rejecting heat of condensation to cooling air, and conducting substantially all of the condensate to the place of evaporation.

4. In the art of refrigeration employing a system using inert gas into which refrigerant evaporates at a place of evaporation and from which refrigerant is absorbed into absorption solution at a place of absorption, at least a part of the heat of absorption rejected at the place of absorption being taken up by cooling air, the improvement which comprises flowing unevaporated liquid refrigerant from the place of evaporation to a place of vaporization in heat exchange relation with the place of absorption, vaporizing liquid refrigerant from the place of evaporation at said place of vaporization without change in its concentration by heat of absorption, liquefying the vaporized refrigerant and conducting substantially all of such liquid to the place of evaporation.

5. In the art of refrigeration employing a system using inert gas into which refrigerant evaporates at a place of evaporation and from which refrigerant is absorbed into absorption solution at a place of absorption, the improvement which comprises flowing excess liquid leaving the place of evaporation to a place of vaporization, vaporizing such liquid at the place of vaporization without change in its concentration by heat rejected at the place of absorption, condensing the vaporized fluid and conducting substantially all of the condensate to the place of evaporation.

6. An absorption refrigeration system comprising a circuit for inert gas including an absorber, a circuit for absorption solution including said absorber and a heat receiving part, conduit means connected to receive refrigerant fluid expelled from solution in said heat receiving part and deliver liquid refrigerant to said gas circuit for evaporation in the presence of the inert gas to produce a refrigerating effect, and structure for recirculating through said gas circuit to produce useful refrigeration excess liquid refrigerant flowing by gravity toward said absorber, said structure comprising connections providing a path of flow for such excess liquid in which the liquid is vaporized while segregated from solution in said solution circuit and the vaporized fluid is liquefied and substantially all of such liquid is conducted to said gas circuit to produce useful refrigeration, the portion of said path of flow in which vaporization is effected being in heat exchange relation with said absorber to promote vaporization of the excess liquid by heat of absorption.

7. An absorption refrigeration system containing an auxiliary agent and including a heat receiving part, a condenser, an evaporator and an absorber; connections for the aforementioned parts whereby refrigerant fluid expelled from absorption solution in said heat receiving part is condensed in said condenser and the liquid condensate is conducted to said evaporator for evaporation therein in the presence of the auxiliary agent, auxiliary agent is circulated through and between said evaporator and said absorber in which refrigerant fluid is absorbed into absorption solution, and solution is circulated through and between said absorber and said heat receiving part; and structure for supplying liquid to said evaporator at a rate greater than the rate at which liquid refrigerant is formed in said condenser by the liquefaction of refrigerant fluid expelled from absorption solution in said heat receiving part, said structure including a vaporizing vessel connected to receive unevaporated liquid refrigerant passing from said evaporator, said vaporizing vessel being in heat exchange relation with said absorber and providing a place for holding a body of liquid refrigerant segregated from the solution in said absorber.

8. An absorption refrigeration system containing an inert gas comprising a gas circuit including an evaporator and an absorber, an absorption solution circuit including said absorber and a heat receiving part, a condenser connected to receive refrigerant fluid expelled from solution in said heat receiving part and deliver liquid refrigerant to said evaporator, a vaporizing vessel arranged in heat exchange relation with said absorber, and structure including said vaporizing vessel for vaporizing liquid and liquefying the vaporized fluid and conducting such liquid to said evaporator, said vaporizing vessel being connected to receive only excess liquid from said evaporator.

9. An absorption refrigeration system containing an inert gas comprising a gas circuit including an evaporator and an air-cooled absorber, an absorption solution circuit including said absorber and a heat receiving part, an air-cooled condenser connected to receive refrigerant fluid expelled from solution in said heat receiving part and deliver liquid refrigerant to said evaporator, a vaporizing vessel arranged in heat exchange relation with said absorber, conduit means including a liquid trap for conducting to said vessel excess liquid leaving said evaporator, conduit means for draining liquid from said vessel to said solution circuit, and conduit means for conducting to said condenser vapor formed in said vessel.

10. An absorption refrigeration system as set forth in claim 9 in which said absorber includes a looped coil and an absorber vessel to which the lower end of said coil is connected, said vaporizing vessel being disposed in heat exchange relation with a part of said coil, and said conduit means for draining liquid being connected at its lower end to the absorber vessel below the liquid level therein.

11. An absorption refrigeration system containing an inert gas comprising a number of parts including an evaporator and an absorber interconnected to form a gas circuit, a heat receiving part and said absorber interconnected to form an absorption solution circuit, a condenser connected to receive refrigerant fluid expelled from solution in said heat receiving part and deliver liquid refrigerant to said evaporator, a vaporizing vessel arranged in heat exchange relation with one of said parts normally dissipating heat during operation of the system, and structure including said vaporizing vessel for vaporizing liquid and liquefying the vaporized fluid and conducting such liquid to said evaporator, said vaporizing vessel being connected to receive only excess liquid from said evaporator.

12. In the art of refrigeration employing a system having a circuit for inert gas including an evaporator in which liquid refrigerant evaporates in the presence of the gas and an absorber which also forms part of an absorption solution circuit and in which refrigerant is absorbed into the solution, the improvement which comprises adjusting the concentration of refrigerant in the absorption solution with variations in operating conditions by withdrawing excess liquid refrigerant from the evaporator upon decrease in load, supplying heat of absorption to such withdrawn refrigerant to vaporize the liquid, liquefying the vaporized refrigerant by transferring heat of condensation to a cooling medium in heat transfer relation therewith, and reintroducing such liquid refrigerant into the gas circuit for flow through the evaporator, thereby continuously recirculating through said gas circuit excess liquid refrigerant withdrawn from the evaporator.

WILHELM GEORG KÖGEL.

REFERENCES CITED

The following references are of record in the file of this patent:

UNITED STATES PATENTS

| Number | Name | Date |
|---|---|---|
| 1,897,223 | Altenkirch | Feb. 14, 1933 |
| 1,924,770 | Backstrom | Aug. 29, 1933 |
| 1,925,361 | Altenkirch | Sept. 5, 1933 |
| 1,976,202 | Thomas | Oct. 9, 1934 |
| 1,994,080 | Ullstrand | Mar. 12, 1935 |
| 2,063,276 | Thomas | Dec. 8, 1936 |
| 2,069,865 | Ullstrand | Feb. 9, 1937 |
| 2,096,093 | Drevet | Oct. 19, 1937 |
| 2,266,783 | Lynger | Dec. 23, 1941 |